United States Patent [19]

Gonser

[11] Patent Number: 5,005,690
[45] Date of Patent: Apr. 9, 1991

[54] CONVEYOR CARRIAGE

[75] Inventor: Jochen Gonser, Kornwestheim, Fed. Rep. of Germany

[73] Assignee: Veit Transpo GmbH

[21] Appl. No.: 359,891

[22] Filed: Jun. 1, 1989

[30] Foreign Application Priority Data

Jun. 3, 1988 [DE] Fed. Rep. of Germany ... 8807283[U]

[51] Int. Cl.⁵ ............................................. B65G 47/46
[52] U.S. Cl. .................................................. 198/350
[58] Field of Search ....................... 198/350, 678, 349;
104/88; 105/153

[56] References Cited

U.S. PATENT DOCUMENTS

| | | | |
|---|---|---|---|
| 3,536,182 | 10/1970 | Rehrig | 198/350 |
| 4,484,525 | 11/1984 | Forshee et al. | 198/678 |
| 4,597,495 | 7/1986 | Knosby | |

FOREIGN PATENT DOCUMENTS

| | | | |
|---|---|---|---|
| 0101125 | 2/1984 | European Pat. Off. | |
| 0103730 | 3/1984 | European Pat. Off. | |
| 0203290 | 12/1986 | European Pat. Off. | |
| 0220380 | 5/1987 | European Pat. Off. | |
| 0242906 | 10/1987 | European Pat. Off. | |
| 0257688 | 3/1988 | European Pat. Off. | |
| 1506858 | 10/1971 | Fed. Rep. of Germany | |
| 3242551 | 5/1983 | Fed. Rep. of Germany | |
| 3313481 | 10/1984 | Fed. Rep. of Germany | |
| 8525331 | 5/1986 | Fed. Rep. of Germany | |
| 85057 | 7/1978 | Japan | 198/350 |
| 695916 | 11/1979 | U.S.S.R. | 198/350 |
| 737325 | 6/1980 | U.S.S.R. | 198/350 |

Primary Examiner—Joseph E. Valenza
Attorney, Agent, or Firm—Finnegan, Henderson, Farabow, Garrett & Dunner

[57] ABSTRACT

Known conveyor carriages are provided with code carriers disposed on an outer side of the conveyor carriage. These code carriers are neither protected from damage, nor can they be read in alternative positions of the conveyor carriage and/or of the reading unit. In contrast thereto, if the conveyor carriage is formed as a housing from an electronic circuit of the non-contacting control type acting as the code carrier, the code carrier is protectively housed and can be read or controlled from the desired direction. The conveyor carriage according to the invention is suitable for overhead conveyor systems.

4 Claims, 2 Drawing Sheets

CONVEYOR CARRIAGE

DESCRIPTION

The invention relates to a conveyor carriage having a code carrier allowing identification of the carriage and the good during conveying.

A conveyor carriage of this type is known from DE-GM 85 35 331. The code carrier employed in this known conveyor carrier is a computer-readable label (bar code) or comprises a number of cams or the like. Code carriers of this type can only be applied to one side surface of the conveyor carriage, so that they can be read or scanned from the respective side. This requires the conveyor carriage to always travel along the rails at the same orientation, and the reading or scanning apparatus to be always mounted on the same side of the conveyor rails. In addition, the known code carriers are rather failure-prone and can easily be damaged, for instance by an impact of the conveyor carrier or when the latter is taken off the rails for storage. These shortcomings reduce the usefulness of the known conveyor carriage. Moreover, when a recoding of the conveyor carriage is desired, the code carrier has to be replaceably mounted on the conveyor carriage, resulting in difficulties regarding the selection of the correct code carrier for any given application.

It is an object of the invention to provide a conveyor carriage including a code carrier the reading of which can be more readily adapted to operational conditions and which is protected from damage and erroneous encoding.

The employ of an electronic circuit of the non-contacting control type as the code carrier permits the reading unit to be mounted at any suitable location in accordance with operational and space considerations. Circuits of this non-contacting controllable type are generally known from prior art. Electromagnetically controllable and inductively coupled circuits are thus for instance known from EP-A-0 101 125, EP-A-0 242 906 and EP-A-0 257 688. These known circuits are practically maintenance-free, they are only supplied, however, together with a disc- or box-shaped housing to be attached to the structural components to be identified. The attachment of a code carrier housing of this type to a conveyor carriage is out of the question, however, since this would result in the same problems as in the case of the prior-art conveyor carriage. The construction of the conveyor carriage itself as the housing for the circuit alone permits the latter to be disposed at a location permitting it to be controlled or read from both sides of the conveyor carriage while ensuring its reliable protection from damage due for instance to collision of two or more conveyor carriages. In addition the accommodation of the code carrier and the manufacture of the stirrup hanger are considerably simplified.

The embedding of the code carrier in a filler mass ensures the hermetically sealed accommodation of the circuit and its protection from dust and environmental influences.

The employ of an electromagnetically or inductively controlled circuit is economically advantageous. In addition, a circuit of this type is small enough for its accommodation in the conveyor carriage according to the invention. A hybrid circuit and a coil further improve readability and controllability.

An embodiment of the invention shall now be described by way of example with reference to the accompanying drawings, wherein.

Figure 1:
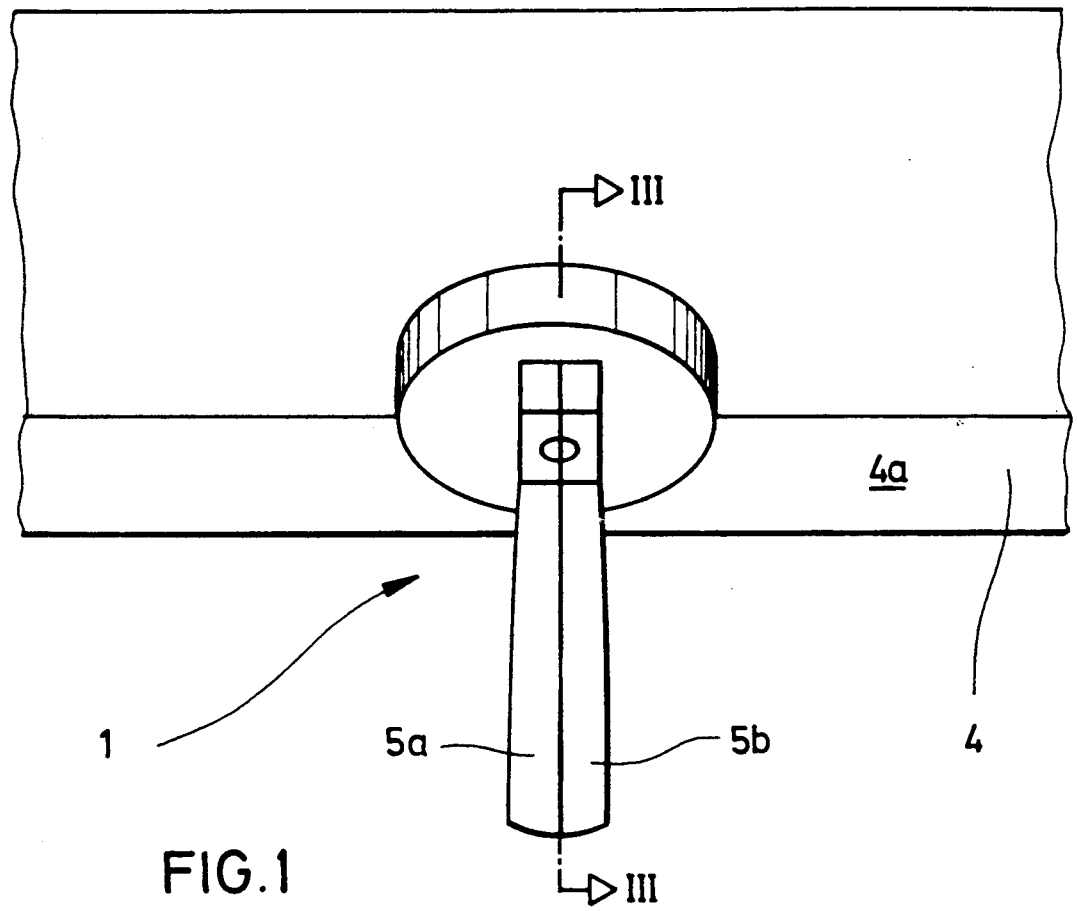
FIG. 1 shows a sideview of a conveyor carriage according to the invention.
Figure 2:
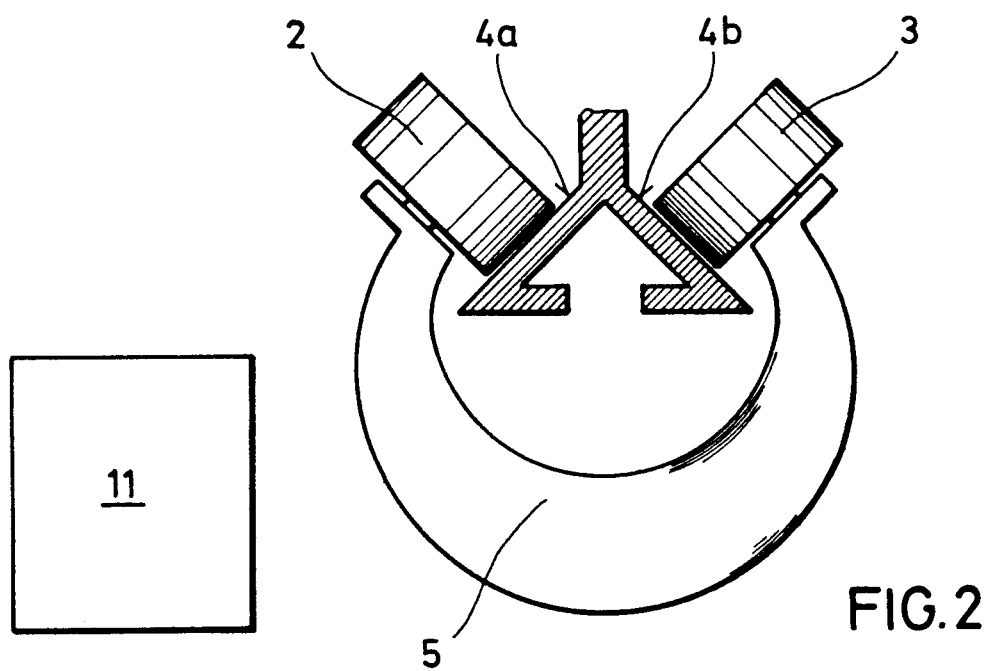
FIG. 2 shows a front view of the conveyor carriage according to the invention.

FIGS. 1 and 2 respectively show a sideview and a front view of a conveyor carriage 1 having a pair of casters 2 and 3 for travelling on a rail 4. Casters 2 and 3 are connected to one another by a plastic stirrup hanger 5 so that their axes extend at right angles relative to one another. Rail 4 has a substantially roof-shaped profile forming a support surface 4a and 4b, respectively, for each castor 2, 3. Stirrup hanger 5 is divided transversely of the conveying direction along rail 4 and composed of two shell portions 5a and 5b. The two shell portions 5a and 5b are substantially of the same shape, so that they can be cast or injection-moulded in one and the same mould. The transverse division of stirrup hanger 5 does not impair its rigidity in the conveying direction.

Figure 3:
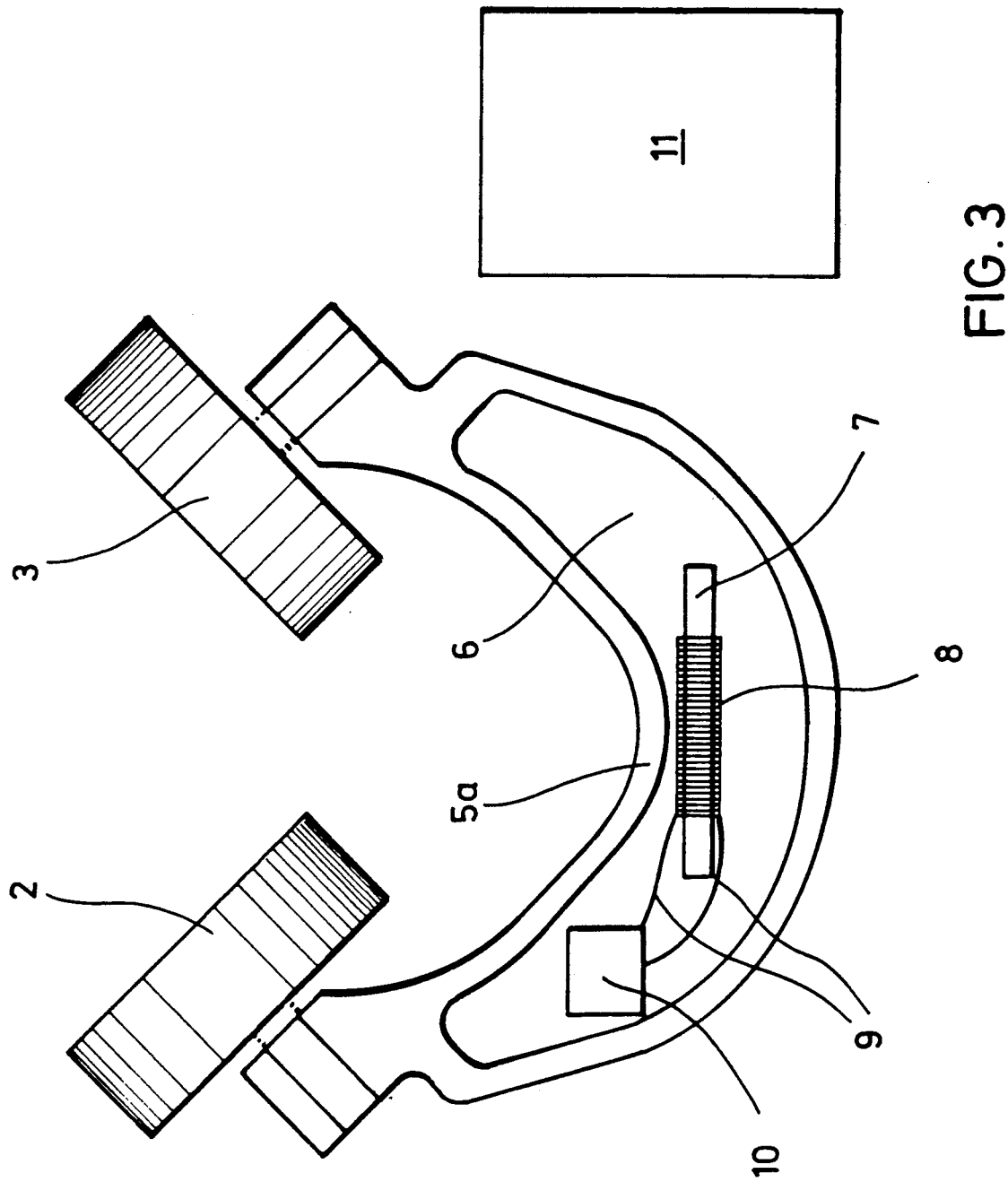
FIG. 3 shows a sectional view taken along the line III—III in FIG. 1.

At least one of the two shell portions 5a, 5b is formed with an interior cavity 6 as shown in FIG. 3. Inserted into this cavity 6 is a ferrite core 7 having a coil 8 wound thereon. Ferrite core 7 cooperates with coil 8 to act as an antenna. Connector wires 9 connect coil 8 to a hybrid circuit 10 acting as an information carrier. For the protection of hybrid circuit 10, ferrite core 7 with coil 8 and connecting wires 9 from the influences of climate, moisture and dust, the named components are embedded in a cast resin completely filling cavity 6. For facilitating assembly, particularly the touch-sensitive hybrid circuit may be enclosed in a protective cover. After the circuit has been thus embedded, the two shell portions 5a and 5b of stirrup hanger 5 are joined either releasably, as by means of screws or detent members, or permanently, as by means of an adhesive. In this manner stirrup hanger 5 forms a completely sealed housing for the code carrier.

The antenna, i.e. ferrite core 7 and coil 8, extends substantially perpendicular to the conveying direction, and lies substantially horizontal when casters 2 and 3 travel on rail 4. A reading unit 11 is mounted at a suitable position to the right or to the left of rail 4, substantially at the level of ferrite core 7.

When conveyor carriage 1 with its ferrite core 7 passes through a field generated by reading unit 11, a signal corresponding to the informations stored in hybrid circuit 10 of the respective conveyor carriage 1 is generated for display in reading unit 11 by an inductive coupling effect (electromagnetic transmission), this signal permitting the respective conveyor carriage 1 to be identified without having to be stopped. In addition, this identification system composed of the circuit and the reading unit offers the possibility of writing, i.e. the informations stored in hybrid circuit 10 cannot only be read, but can also be rewritten or altered.

In a modification of the described and illustrated embodiment, the housing for the code carrier may for instance be formed by a carrier beam member extending in the conveying direction and interconnecting two stirrup hangers supported on respective casters. When the antenna composed of the ferrite core and the coil is disposed vertically and perpendicular to the conveying direction, the reading units to be employed may be disposed above and/or below the conveyor carriage.

Any other orientation of the antenna between the horizontal and the vertical positions is likewise possible. If need be it is also possible to provide two or more antennas, possibly at different orientations. Instead of the described electromagnetically controllable and inductively coupled circuit it is also possible to employ for instance an acoustically controllable circuit (microphone circuit). If a higher expenditure in terms of material is deemed acceptable, at least the half of the stirrup hanger not provided with the circuit may consist of solid material. Finally, any castable plastic compound may be used for embedding the circuit therein.

What is claimed is:

1. A conveyor carriage, for an overhead conveying system, including a U-shaped frame, two casters for engaging a rail for travelling along a conveying direction, and a proximity-readable code carrier, said casters being supported and connected to one another by said frame, said frame being formed with an interior cavity so that said frame forms a housing for the accommodation into said U-shaped frame of said proximity-readable code carrier to protect said proximity-readable code carrier from damage, said proximity-readable code carrier including an electronic circuit of the non-contacting control type.

2. A conveyor carriage according to claim 1, characterized in that said code carrier is embedded in a filler mass, particularly a cast resin.

3. A conveyor carriage according to claim 1, characterized by the employ of an electromagnetically or inductively controllable circuit.

4. A conveyor carriage according to claim 3, characterized in that in the case of employ of a hybrid circuit and a coil acting as an antenna, said coil is disposed substantially perpendicular to the conveying direction.

* * * * *